Feb. 15, 1955 P. GRAEFE 2,702,045
STEAM WATER DRAIN WITH A FLOAT CONTROLLED
HORIZONTAL SHUTOFF ELEMENT
Filed June 10, 1952
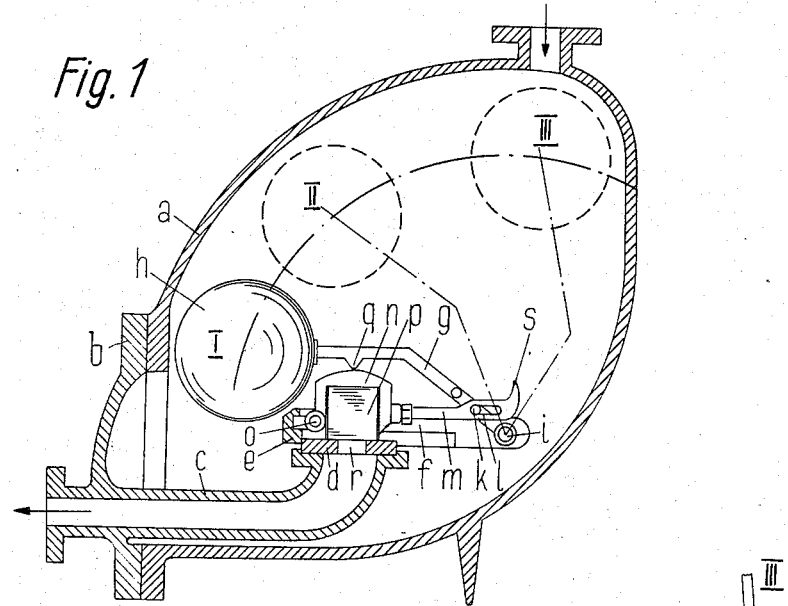
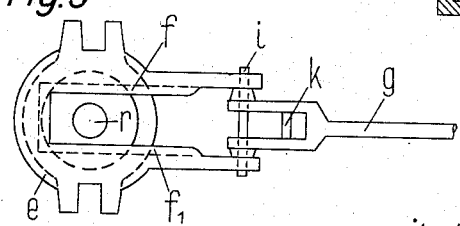
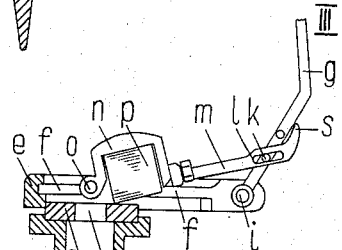
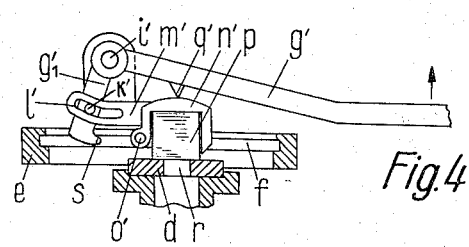
INVENTOR:
Paul Graefe

United States Patent Office 2,702,045
Patented Feb. 15, 1955

2,702,045

STEAM WATER DRAIN WITH A FLOAT CONTROLLED HORIZONTAL SHUTOFF ELEMENT

Paul Graefe, Frankfurt (Main) Schwanheim, Germany

Application June 10, 1952, Serial No. 292,751

Claims priority, application Germany June 15, 1951

9 Claims. (Cl. 137—192)

The present invention relates to a steam water drain with a float controlled horizontal shut-off element.

A lateral sliding movement of the valve face without previous relief of pressure is not possible in case of drains where high steam pressure presses the valve face against the packing face of the outlet. Therefore, flat slides have already been proposed which are rigidly connected to a control lever. Such devices, however, have the disadvantage that the sealing face between the flat slide and the sealing plate beneath on the one hand and the position of the float lever relative to the elongated hole of the slide control lever on the other hand must be adjusted very carefully in order to attain a tight seal. Besides, the slide plate with the control arm will easily vibrate (e. g., railway shipment) thereby dislocating the above mentioned careful adjustment. Furthermore, a part of the pressure of the steam water will be exerted upon the slide plate from above if the flat slide is partly opened, which fact leads to leakages and steam losses during the uninterrupted sliding movement of the slide plate.

According to the invention these disadvantages are avoided in that, e. g., a boxlike housing guided in two grooves of a guide way encloses a prismatic slide plug with some play. At the same time, however, this housing is rigidly connected to a control arm provided with an elongated hole at its free end, which hole receives a roller or a sliding pin of the float lever. Thus, the freely connected slide plug which serves as a shut-off element can be tightly pressed against the outlet in the locking or sealing position. Shocks or tilting, for instance, during railway shipment cannot dislocate parts of the device due to the support in the guide way.

The steam water current has no longer any jamming or pressing influence on the slide plug when the outlet is partly opened since the plug is covered by the clamp.

Two forms of apparatus in accordance with the invention will now be described by way of example and with reference to the accompanying drawing, in which:

Fig. 1 is a vertical section along the longitudinal axis of a drain with a one-armed lever in sealing position;

Fig. 2 is a side view of the control elements;

Fig. 3 is a top view of guide way and float lever; and

Fig. 4 is a sectional view of another ambodiment using a two-armed lever.

The device according to Fig. 1 comprises a housing $a$, a cover $b$, and an outlet pipe $c$ preferably mounted at the cover $b$ and, in turn, supporting a sliding plate $d$ and a guide way $e$ having guiding grooves $f$, $f_1$. A float lever $g$ with float $h$ provided around bolt $i$ is provided with a bolt or roller $k$ which slides in an elongated hole $l$ in a control arm $m$ rigidly connected to a boxlike housing $n$. The housing $n$ has two elongations $o$ shaped as rolling pivots, which engage with the guiding grooves $f$, $f_1$, of the guide way $e$. The housing $n$ encloses almost completely a sealing member $p$ of a prismatic or cubelike shape. Said sealing member $p$ is sealingly seated on the sliding plate $d$ and its aperture $r$. The float lever $g$ is preferably provided with a nose $q$. The control lever $m$ is provided with a dog $s$ at its free end; so that the path of the tilted parts $n$, $p$ is prolonged and the opening of the aperture or outlet $r$ is accelerated. By means of the nose $q$ of the float lever $g$, the housing $n$ or the sealing member $p$ can be additionally loaded in the sealing position.

The steam water drain as described above will operate as follows: The float lever $g$ when turned upwards by the raising float $h$ will push the control arm $m$ upwards by means of the sliding roller $k$ moving in the elongated hole $l$ so that the housing $n$ will tilt the sealing member $p$ around the point of rotation $o$, thereby relieving the sealing member $p$ of the pressure, as shown in position II of Fig. 1. As a consequence to this relief, the float $h$ will proceed quickly to the surface, pulling the housing $n$ which slides in the guiding grooves $f$, $f_1$, together with the sealing member $p$, completely away from the outlet $r$, as shown in position III of Fig. 1. Upon the drainage of the steam water, the float $h$ pushes the housing $n$ along the grooves $f$ together with the sealing member $p$ back to its initial position, as shown in position I of Fig. 1, at which position the sealing member shuts the outlet $r$ without any trouble.

By means of the dog $s$ the path of the slide can be prolonged and the opening of the outlet accelerated. The same effect, obviously, can also be attained by a modified design using a two-armed float lever, as shown in Fig. 4. In this case the float lever is designed as a double armed angled lever $g'$, $g_1'$, which in turn is pivoted around the bolt $i'$. The smaller arm of the lever, $g_1'$, engages in the same way with the elongated hole $l'$ of the control arm $m'$ with its roller $k'$ so that the roller $k'$ of the lever arm $g_1'$ moves forward within the elongated hole $l'$, when the float lever $g'$ moves upwards in the direction indicated by the arrow, whereby the control arm $m'$ is pressed downwards. Consequently, the sealing member $p$ is tilted and is relieved of the steam pressure. When the float lever arm $g'$ moves on in the direction indicated by the arrow, the dog or pivot $s$ provided at the end of the lever arm $g_1'$ will push against the housing $n'$ and thus push the sealing plug $p$ away from the outlet $r$ in the same manner as described for the process applying to Fig. 2.

It will be understood that the invention is not only applicable to horizontal sealing faces of sliding parts, such as $d$, $p$, but also to vertical or inclined sealing faces, in which case it is only necessary to give levers such as $g$, $m$ a slightly different shape.

I claim:

1. In a steam trap, a chamber having a discharge port, a member ordinarily closing, and being adapted to be moved to open, said port, a float controlling said member, guiding means for the member, and connections between the member and the float, said member including a body forming the closing element proper, a housing holding said body, and two pins provided on the housing, said guiding means including a guideway provided with two groovelike formations, each receiving one of said pins for tilting and sliding movements of said housing and body, said connections including levers converting the rising movement of the float first into a tilting and then into a sliding movement of the said member.

2. In a steam trap according to claim 1, said body having flat sides, one side controlling the discharge port, said housing enclosing the body at at least three sides.

3. In the steam trap according to claim 2, a prismatically shaped body.

4. In the steam trap according to claim 2, the body being of cubic shape.

5. In the steam trap according to claim 1, said connections including a guide arm, one end thereof being rigidly connected to the housing, the other end portion of the guide arm being provided with an elongated slot, a float lever pivotally secured, and connected at one end to the float, and a bolt supported by the float lever and arranged to slide within said slot.

6. In the steam trap according to claim 5, the float lever being pivotally secured at one end, and being connected at its other end to the float.

7. In the steam trap according to claim 6, the guide arm being rigidly connected to the housing at the side opposite to the pin-carrying side, and being provided with a dog at its free end.

8. In the steam trap according to claim 5, the guide arm being rigidly connected to the housing at the pin-carrying side, the float lever being two-armed, one arm carrying said bolt for sliding movements within said slot.

9. In the steam trap according to claim 8, said bolt-carrying arm being provided with a dog at its free end.

References Cited in the file of this patent

UNITED STATES PATENTS

| | | |
|---|---|---|
| 1,143,550 | Nunez | June 15, 1915 |

FOREIGN PATENTS

| | | |
|---|---|---|
| 330,081 | Germany | Dec. 7, 1920 |